(12) United States Patent
Hiraiwa et al.

(10) Patent No.: US 11,996,589 B2
(45) Date of Patent: May 28, 2024

(54) FUEL CELL

(71) Applicant: SUMITOMO ELECTRIC INDUSTRIES, LTD., Osaka (JP)

(72) Inventors: Chihiro Hiraiwa, Osaka (JP);
Mitsuyasu Ogawa, Osaka (JP);
Takahiro Higashino, Osaka (JP);
Koma Numata, Osaka (JP); Masatoshi Majima, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 327 days.

(21) Appl. No.: 17/270,656

(22) PCT Filed: Jul. 25, 2019

(86) PCT No.: PCT/JP2019/029260
§ 371 (c)(1),
(2) Date: Feb. 23, 2021

(87) PCT Pub. No.: WO2020/049888
PCT Pub. Date: Mar. 12, 2020

(65) Prior Publication Data
US 2021/0202960 A1    Jul. 1, 2021

(30) Foreign Application Priority Data
Sep. 5, 2018 (JP) .................. 2018-166259

(51) Int. Cl.
*H01M 8/0232* (2016.01)
*H01M 8/0241* (2016.01)
(Continued)

(52) U.S. Cl.
CPC ....... *H01M 8/0232* (2013.01); *H01M 8/0241* (2013.01); *H01M 8/0247* (2013.01); *H01M 8/12* (2013.01)

(58) Field of Classification Search
CPC ............. H01M 8/0232; H01M 8/0241; H01M 8/0247; H01M 8/12; H01M 8/0258; H01M 2008/1293; H01M 8/0245; Y02E 60/50
See application file for complete search history.

(56) References Cited

U.S. PATENT DOCUMENTS

2013/0108947 A1* 5/2013 Okuno ................ H01M 8/0245
429/522
2013/0266862 A1   10/2013 Okuno et al.
(Continued)

FOREIGN PATENT DOCUMENTS

CN     106463734 A    2/2017
CN     107925092 A    4/2018
(Continued)

OTHER PUBLICATIONS

Electrochemical Validation of In-Cell Chromium Getters to Mitigate Chromium Poisoning in SOFC Stack, Journal of the Electrochemical Society, vol. 164, No. 13, published Oct. 3, 2017 (Uddin). (Year: 2017).*

(Continued)

*Primary Examiner* — Ula C Ruddock
*Assistant Examiner* — Sarika Gupta
(74) *Attorney, Agent, or Firm* — Oliff PLC

(57) ABSTRACT

A fuel cell includes: a cell structure body including a cathode, an anode, and a solid electrolyte layer interposed between the cathode and the anode; and a current collector in contact with the cathode, wherein an oxidant is supplied to the cathode through the current collector, the current collector includes a porous body made of a metal material, and a chromium adsorbent carried inside pores of the porous body, the metal material includes a first metal and a second metal, the first metal includes nickel, and the second metal includes at least one selected from the group made of tin, (Continued)

aluminum, cobalt, titanium, manganese, tungsten, copper, silver, and gold.

6 Claims, 7 Drawing Sheets

(51) Int. Cl.
*H01M 8/0247* (2016.01)
*H01M 8/12* (2016.01)

(56) References Cited

U.S. PATENT DOCUMENTS

| | | | |
|---|---|---|---|
| 2014/0057184 A1* | 2/2014 | Pillai | H01M 8/0263 429/410 |
| 2014/0272622 A1* | 9/2014 | Xing | H01M 8/0243 429/535 |
| 2016/0351912 A1 | 12/2016 | Qiu et al. | |
| 2017/0025687 A1 | 1/2017 | Noda et al. | |
| 2018/0219232 A1 | 8/2018 | Okuno et al. | |
| 2018/0261863 A1* | 9/2018 | Agnew | H01M 8/0662 |
| 2019/0036131 A1 | 1/2019 | Hiraiwa et al. | |

FOREIGN PATENT DOCUMENTS

| | | |
|---|---|---|
| JP | 2010-033747 A | 2/2010 |
| JP | 2010-519716 A | 6/2010 |
| JP | 2012-500462 A | 1/2012 |
| JP | 2012-119212 A | 6/2012 |
| JP | 2012-132083 A | 7/2012 |
| JP | 2017-135090 A | 8/2017 |
| WO | 2008/104760 A1 | 9/2008 |
| WO | 2010/020797 A1 | 2/2010 |
| WO | 2015/137102 A1 | 9/2015 |
| WO | 2015/142782 A1 | 9/2015 |

OTHER PUBLICATIONS

Hu et al., "High Surface Area Getter Materials for Chromium and Sulfur Capture in SOFC Systems," The 18th Annual Solid Oxide Fuel Cell (SOFC) Project Review Meeting, Pittsburgh, PA, Jun. 12 to 14, 2017.

Uddin et al., "Electrochemical Validation of In-Cell Chromium Getters to Mitigate Chromium Poisoning in SOFC Stack," Journal of the Electrochemical Society, vol. 164, No. 13, pp. F1342-F1347, 2017.

Oct. 15, 2019 International Search Report issued in International Patent Application No. PCT/JP2019/029263.

Oct. 29, 2019 International Search Report issued in International Patent Application No. PCT/JP2019/029260.

U.S. Appl. No. 17/270,600, filed Feb. 23, 2021 in the name of Hiraiwa et al.

Sep. 19, 2023 Office Action issued in U.S. Appl. No. 17/270,600.
Jan. 19, 2024 Notice of Allowance issued in U.S. Appl. No. 17/270,600.

* cited by examiner

FUEL CELL

TECHNICAL FIELD

The present disclosure relates to a fuel cell. The present application claims priority to Japanese Patent Application No. 2018-166259 filed on Sep. 5, 2018. The entire contents described in the Japanese patent application are incorporated herein by reference.

BACKGROUND ART

A fuel cell is a device that generates power by an electrochemical reaction between a fuel gas such as hydrogen and an oxidant such as air. Since the fuel cell can directly convert chemical energy into electricity, it has a high power generation efficiency. Inter alia, a solid oxide fuel cell (hereinafter referred to as an SOFC) having an operating temperature of 700° C. or higher, about 800° C. to 1000° C. in particular, is promising, because it has a fast reaction speed. For the SOFC, a membrane electrode assembly (MEA) is used, in which an electrolyte layer including a solid oxide is sandwiched between and integrated with two sheets of electrodes composed of ceramics (sintered bodies). That is, all the constituent elements of the MEA are solid, and thus they are easily handled.

As a member constituting a fuel cell, an alloy including chromium (chromium alloy) such as stainless steel may be used, because the chromium alloy is excellent in heat resistance and oxidation resistance. However, when an SOFC is operated, the chromium included in the chromium alloy is vaporized and scattered within the fuel cell. The scattered chromium reacts with a metal oxide (for example, lanthanum strontium cobalt ferrite (LSCF)) constituting a cathode, and produces $SrCrO_4$ and chromium oxide. These products are accumulated at an interface between the cathode and an electrolyte layer, and deteriorate electrode reaction. As a result, power generation performance is deteriorated.

Patent Literature 1 (Japanese Patent National Publication No. 2010-519716) and Patent Literature 2 (Japanese Patent National Publication No. 2012-500462) teach coating an inner surface of a hood of a fuel cell with a chromium adsorbent. Non-Patent Literature 1 (The 18th Annual Solid Oxide Fuel Cell (SOFC) Project Review Meeting, Pittsburgh, Jun. 12 to 14, 2017) teaches a chromium adsorption material including a honeycomb structure body made of ceramics and a chromium adsorbent.

CITATION LIST

Patent Literature

PTL 1: Japanese Patent National Publication No. 2010-519716
PTL 2: Japanese Patent National Publication No. 2012-500462

Non Patent Literature

NPL 1: The 18th Annual Solid Oxide Fuel Cell (SOFC) Project Review Meeting, Pittsburgh, Jun. 12 to 14, 2017

SUMMARY OF INVENTION

An aspect of the present disclosure relates to a fuel cell including: a cell structure body including a cathode, an anode, and a solid electrolyte layer interposed between the cathode and the anode; and a current collector in contact with the cathode, wherein an oxidant is supplied to the cathode through the current collector, the current collector includes a porous body made of a metal material, and a chromium adsorbent carried inside pores of the porous body, the metal material includes a first metal and a second metal, the first metal includes nickel, and the second metal includes at least one selected from the group consisting of tin, aluminum, cobalt, titanium, manganese, tungsten, copper, silver, and gold.

DETAILED DESCRIPTION

Figure 1:
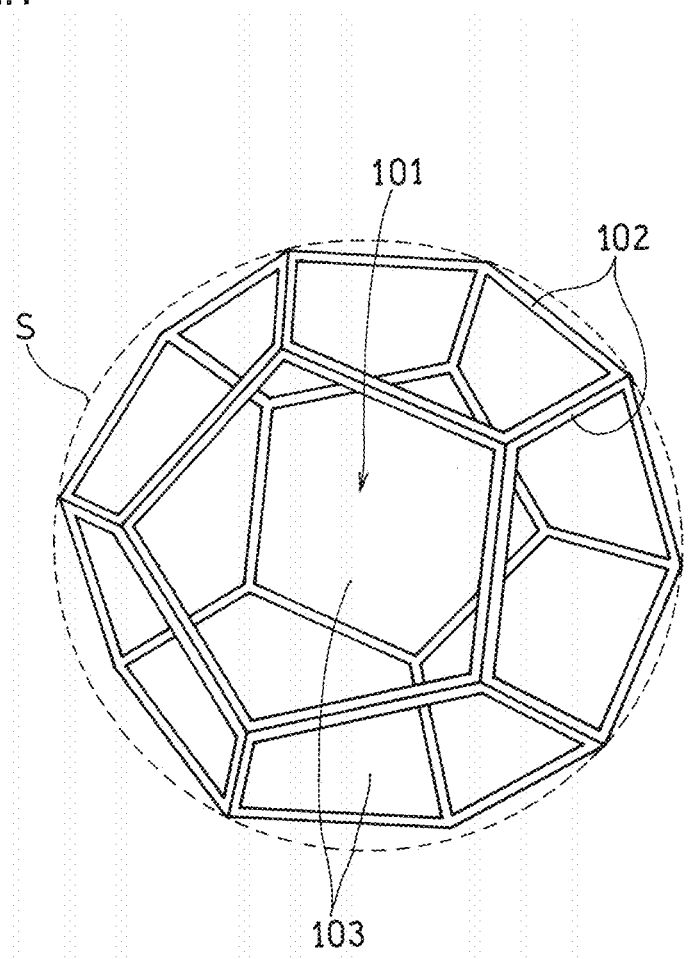
FIG. 1 is a schematic view showing an example of a structure of a portion of a skeleton of a porous body.

Problem to be Solved by the Present Disclosure

It is difficult to arrange a sufficient amount of a chromium adsorbent within a battery by the methods in Patent Literatures 1 and 2. Arranging a chromium adsorption material within a fuel cell as in Non-Patent Literature 1 causes an increase in the size of the fuel cell as well as an increase in the number of components, resulting in a complicated assembly process. In addition, the honeycomb structure body made of ceramics in Non-Patent Literature 1 has heat resistance but is vulnerable to temperature change. An SOFC operated at a high temperature of 700° C. to 1000° C. is subjected to a wide temperature change from room temperature to 1000° C. by repetition of operation and stop. Accordingly, the chromium adsorption material arranged within the fuel cell is required to have a high thermal shock resistance.

An object of the present disclosure is to provide a fuel cell that has a high thermal shock resistance and is excellent in power generation performance, without increasing the number of components.

Advantageous Effect of the Present Disclosure

According to the present disclosure, a fuel cell that has a high thermal shock resistance and is excellent in power generation performance can be provided without increasing the number of components.

Description of Embodiment of the Present Invention

First, contents of an embodiment of the present disclosure will be described in list form.
(1) A fuel cell of the present disclosure includes: a cell structure body including a cathode, an anode, and a solid electrolyte layer interposed between the cathode and the anode; and a current collector in contact with the cathode, wherein an oxidant is supplied to the cathode through the current collector, the current collector includes a porous body made of a metal material, and a chromium adsorbent carried inside pores of the porous body, the metal material includes a first metal and a second metal, the first metal includes nickel, and the second metal includes at least one selected from the group consisting of tin, aluminum, cobalt, titanium, manganese, tungsten, copper, silver, and gold.

Since the current collector, which is generally used as a member constituting a fuel cell, is provided with a chromium adsorption function, an increase in the number of components can be suppressed, and an increase in the size of the fuel cell is suppressed. Further, although the current collector described above (hereinafter referred to as a first current collector) is made of a metal other than chromium, it has high heat resistance and oxidation resistance, and also has thermal shock resistance. Accordingly, the first current collector can exhibit an excellent chromium adsorption performance over a long period of time, and power generation performance of the fuel cell is maintained high.

(2) Preferably, the metal material includes an alloy of the first metal and the second metal, from the viewpoint of heat resistance, oxidation resistance, and electrical conductivity.

(3) Preferably, a ratio of the second metal to a total amount of the first metal and the second metal included in the metal material is more than or equal to 4% by mass and less than or equal to 15% by mass, from the same viewpoint.

(4) Preferably, the second metal is tin. When the metal material includes nickel and tin, the porous body has particularly high heat resistance and oxidation resistance.

(5) The porous body may have a skeleton with a three-dimensional network structure. Thereby, pressure loss is decreased, and current collectivity is improved.

Details of Embodiment of the Present Invention

Specific examples of the embodiment of the present disclosure will be described below, with reference to the drawings as appropriate. It should be noted that the present invention is not limited to these examples but is defined by the scope of the attached claims, and is intended to include any modifications within the scope and meaning equivalent to the scope of the claims.

A fuel cell includes: a cell structure body including a cathode, an anode, and a solid electrolyte layer interposed between the cathode and the anode; and a first current collector in contact with the cathode. An oxidant is supplied to the cathode through the first current collector.

As described above, when an SOFC operated at a high temperature of 700° C. to 1000° C. repeats operation and stop, it is subjected to a wide temperature change from room temperature to 1000° C. Thus, a current collector is required to have heat resistance and a high thermal shock resistance. The cathode-side current collector (first current collector) in contact with air (oxidizing gas) is exposed to a high-temperature high oxidizing atmosphere. Accordingly, the first current collector is required to have a particularly high oxidation resistance.

(First Current Collector)

The first current collector is a porous body, and is made of a metal material. Accordingly, it is excellent in thermal shock resistance. In addition to a current collection function, the first current collector has a function of supplying an oxidant gas introduced from oxidant dimples to the cathode in a diffused manner.

The metal material includes a first metal and a second metal different from the first metal. The first metal includes nickel (Ni), and the second metal includes at least one selected from the group consisting of tin (Sn), aluminum (Al), cobalt (Co), titanium (Ti), manganese (Mn), tungsten (W), copper (Cu), silver (Ag), and gold (Au). Since the metal material includes the second metal in addition to Ni, oxidation resistance and heat resistance of the first current collector are significantly improved. Inter alia, when the second metal is Sn, oxidation resistance and heat resistance of the first current collector are further enhanced, and electrical conductivity thereof is also improved.

The metal material including the first metal and the second metal is obtained, for example, by coating at least a portion of the surface of a core material including a metal other than the first metal, with a layer including the first metal and the second metal, or by coating at least a portion of the surface of a core material including the first metal, with a layer including the second metal. Inter alia, the metal material obtained by the latter method is preferable, from the viewpoint of heat resistance and oxidation resistance. It is preferable that the ratio of the total amount of the first metal and the second metal to the total amount of the metal material is more than or equal to 80% by mass. Further, it is more preferable that the ratio of the total amount of an alloy of the first metal and the second metal to the total amount of the metal material is more than or equal to 80% by mass.

The ratio of the second metal to the total amount of the first metal and the second metal is preferably more than or equal to 4% by mass, and more preferably more than or equal to 5% by mass, from the viewpoint of oxidation resistance and heat resistance. On the other hand, the ratio of the second metal to the total amount of the first metal and the second metal is preferably less than or equal to 15% by mass, and more preferably less than or equal to 10% by mass, from the viewpoint of heat resistance and electrical conductivity.

When the second metal is Sn, specifically, a Sn-containing layer is formed on the surface of a porous body including Ni (Ni porous body) using plating treatment or the like, and then heat treatment is performed under a reducing atmosphere. Thereby, Sn is diffused into the Ni porous body, and a portion from the surface of the porous body to a region at a certain depth becomes a layer made of an alloy of Ni and Sn (hereinafter may be referred to as a Ni—Sn layer). The Ni—Sn layer has particularly high heat resistance, oxidation resistance, and electrical conductivity.

In the Ni—Sn layer, a first phase and a second phase may coexist. The concentration of Sn to Ni in the first phase is higher than that in the second phase. In the first phase, Ni and Sn exist in the form of an intermetallic compound (for example, $Ni_3Sn$). The second phase is a phase mainly composed of Ni, and it is considered that Sn exists with being dissolved in Ni. The first phase, which is an intermetallic compound phase, has particularly high oxidation resistance and heat resistance. The second phase exhibits high heat resistance and electrical conductivity.

When the ratio of Sn to the Ni—Sn layer is more than or equal to 4% by mass and preferably more than or equal to 5% by mass, and is less than or equal to 15% by mass and preferably less than or equal to 10% by mass, two phases, that is, the intermetallic compound phase (the first phase) mainly composed of $Ni_3Sn$ and the phase mainly composed of Ni and including Sn dissolved in Ni (the second phase), are likely to be observed in the Ni—Sn layer. Accordingly, heat resistance, oxidation resistance, and electrical conductivity of the Ni—Sn layer are likely to be further enhanced.

The form of the porous body is not particularly limited, and it is satisfactory as long as the porous body is made of a metal and is porous. Examples of the porous body include a honeycomb structure body made of a metal, a nonwoven fabric made of metal fibers, a metal mesh, a sponge-like metal (sintered body), a structure body having a skeleton made of a metal with a three-dimensional network structure, and the like. Inter alia, a structure body having a skeleton made of a metal with a three-dimensional network structure (hereinafter referred to as a three-dimensional network structure body) is preferable, because its pressure loss is small. Since the three-dimensional network structure body allows a gaseous body (oxidant) to pass therethrough in any direction, the degree of freedom of design is increased.

The three-dimensional network structure body has a skeleton formed of a fibrous or bar-like metal material forming a network. Such a skeleton may be the same as the skeleton of a nonwoven fabric-like or sponge-like structure, for example. The three-dimensional network structure body has a plurality of pores defined by the skeleton. Adjacent pores are in communication with each other. A chromium adsorbent is carried the pores. In the three-dimensional network structure body, such a skeleton made of a metal and a pore surrounded by the skeleton constitute one cell.

Figure 2:
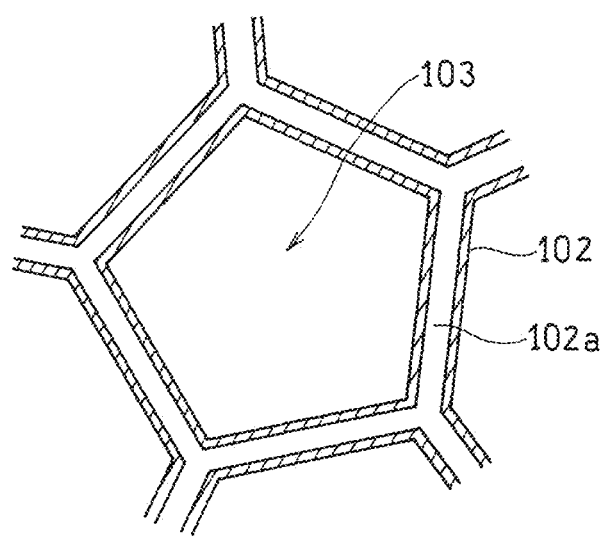
FIG. 2 is a cross sectional view schematically showing a cross section of a portion of the skeleton in FIG. 1.

As shown in FIG. 1, one cell can be represented as a regular dodecahedron model, for example. A pore 101 is defined by a fibrous or bar-like metal portion (a fibrous portion 102). A plurality of pores 101 are continuous in three dimensions. The skeleton of the cell is formed by fibrous portion 102 extending consecutively. In the cell, substantially pentagonal apertures (or windows) 103 each surrounded by fibrous portion 102 are formed. Adjacent cells are in communication with each other with one aperture 103 being shared therebetween. That is, the skeleton of the three-dimensional network structure body is constituted by fibrous portion 102 that extends in the form of a network while defining the plurality of consecutive pores 101. As shown in FIG. 2, fibrous portion 102 may have a void 102a inside, that is, it may be hollow.

The porous body preferably has a porosity of more than or equal to 70%. When the porous body has a porosity of more than or equal to 70%, pressure loss is decreased, and a sufficient amount of the chromium adsorbent is easily carried. On the other hand, the porous body preferably has a porosity of less than or equal to 98%, from the viewpoint of strength.

The porosity of the porous body is defined by the following equation:

Porosity (%)=[1−{$Mp/(Vp \times dp)$}]×100, where Mp: the mass of the porous body [g],
Vp: the volume of the appearance shape in the porous body [$cm^3$], and
dp: the density of metals constituting the porous body [$g/cm^3$].

The pore diameter of the pores is not particularly limited. The pore diameter may be 100 μm to 4000 μm, or may be 200 μm to 1000 μm, for example. When the pore diameter is in this range, pressure loss is decreased, and a sufficient amount of the chromium adsorbent is easily carried.

The pore diameter of the pores is determined as follows. First, any one pore is selected from the three-dimensional network structure body, the diameter of a maximum sphere (not shown) accommodated in this pore and the diameter of a minimum sphere S (see FIG. 1) accommodating this pore are measured, and an average value thereof is defined as a pore diameter of the selected pore. Likewise, respective pore diameters of any plurality of (for example, nine) other pores are determined, and an average value of the pore diameters of these ten pores is defined as a pore diameter of the pores in the three-dimensional network structure body.

Specifically, in a SEM photograph of the three-dimensional network structure body, a region V including ten or more pores is determined. Of the pores included in region V, a predetermined number of (for example, 10) pores are selected randomly and respective pore diameters are determined. An average value of the calculated pore diameters of these pores is determined, and is defined as a pore diameter of the pores in the three-dimensional network structure body.

The three-dimensional network structure body can be formed, for example, by coating a resin porous body (template) having communication holes, with a metal. The metal coating can be performed by a plating treatment method, a vapor phase method (such as evaporation, plasma chemical vapor deposition, or sputtering), application of a metal paste, or the like, for example. By the metal coating treatment, a skeleton in the form of a three-dimensional network is formed. Among these methods, the plating treatment method is preferably used for the metal coating.

The plating treatment method may be any plating treatment method capable of forming a metal layer on the surface of the template (including the surfaces of cavities inside), and a known plating treatment method such as an electrolytic plating method, a molten salt plating method, or the like can be employed. By the plating treatment method, a porous body in the form of a three-dimensional network that reflects the shape of the template is formed. That is, the pore diameter of the obtained porous body can be controlled by the pore diameter of the template.

Figure 3:
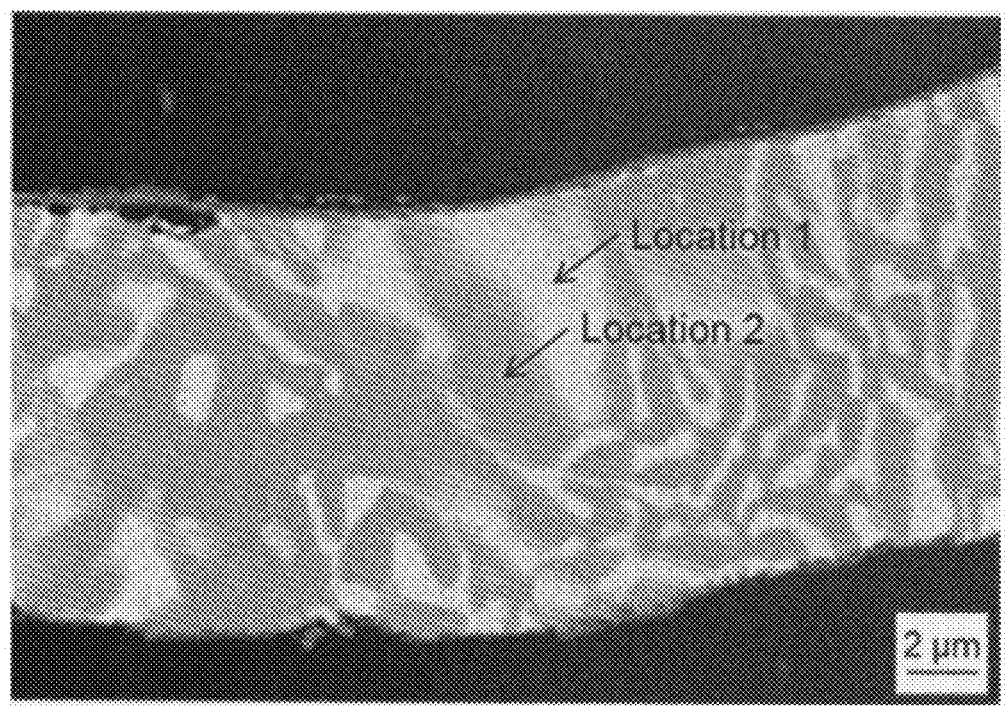
FIG. 3 is a SEM photograph of a Ni—Sn layer.

FIG. 3 is a SEM photograph of a cross section of a hollow Ni porous body (three-dimensional network structure body) obtained by providing Sn plating on the surface of the porous body and then performing heat treatment under a reducing atmosphere. In the SEM photograph, the upper black portion represents a pore, and the lower black portion represents a void inside the fibrous portion.

In FIG. 3, two phases, that is, a portion indicated as Location 1 and a portion indicated as Location 2 in a gray color darker than that in Location 1, were observed. In Location 1, Ni, Sn, and O (oxygen) were included at atomic fractions of 75 atomic %, 18 atomic %, and 7 atomic %, respectively. Thus, it is considered that Location 1 is the first phase in which most of Ni and Sn exist in the form of the intermetallic compound $Ni_3Sn$. On the other hand, in Location 2, Ni, Sn, and O were included at atomic fractions of 91 atomic %, 4 atomic %, and 5 atomic %, respectively. Thus, it is considered that Location 2 is the second phase in which Sn is included with being dissolved in Ni. As can be seen from FIG. 3, the metal material, which is the skeleton, is substantially entirely the Ni—Sn layer.

(Chromium Adsorbent)

The chromium adsorbent is not particularly limited as long as it is a material that can adsorb chromium. Examples of the chromium adsorbent include $SrNiO_3$, MgO, BaO, CaO, SrO, and the like. The form of the chromium adsorbent is not particularly limited, either, and the chromium adsorbent may be particulate or fibrous, for example.

The chromium adsorbent is carried in the pores of the porous body, for example, by immersing the porous body in a slurry in which the chromium adsorbent is dispersed, and then performing heat treatment. The carried amount of the chromium adsorbent is not particularly limited, and is 0.1 g/cm$^3$ to 1 g/cm$^3$, for example.

The size of the chromium adsorbent is not particularly limited, and may be set as appropriate according to the size of the pores of the porous body and the like. A particulate chromium adsorbent has an average particle diameter of 0.5 μm to 10 μm, for example. The average particle diameter refers to a particle diameter at which an accumulated volume is 50% in volume-based particle size distribution measured by laser diffractometry. The average particle diameter may be calculated from a SEM image of a cross section of a chromium adsorption material. Specifically, in a SEM photograph of the chromium adsorption material, a predetermined number of (for example, 10) particles of the particulate chromium adsorbent are selected randomly and respective maximum diameters are measured. An average value of the measured maximum diameters is determined, and is defined as an average particle diameter of the particulate chromium adsorbent.

(Method for Manufacturing First Current Collector)

The first current collector including the hollow porous body having the skeleton with a three-dimensional network structure and the chromium adsorbent is manufactured by the following method, for example.

The method for manufacturing the first current collector includes: a first step of preparing a template having a skeleton with a three-dimensional network structure; a second step of forming a first plating layer including Ni on at least a portion of the surface of the template; a third step of removing the template by heating, and thereby obtaining a hollow porous body (Ni porous body) made of a first metal; a fourth step of forming a second plating layer including a second metal on the surface of the Ni porous body, and thereby obtaining a porous body; and a fifth step of causing a chromium adsorbent to be carried in pores of the porous body.

(1) First Step

A template having a skeleton with a three-dimensional network structure is prepared. As the template, a porous material which can be easily decomposed at a temperature that is less than or equal to the melting points of Ni and a second metal is used. As the porous material, a resin porous body is preferable. As the resin porous body, resin foam, nonwoven fabric, felt, woven fabric, or the like, or a combination thereof can be used.

Among these resin porous bodies, resin foam is more preferably used as the template with a three-dimensional network structure. Examples of the resin foam include urethane foam, styrene foam, and the like. Inter alia, urethane foam is preferable, from the viewpoint of high porosity. The thickness, porosity, and average pore diameter of the resin foam are set as appropriate according to the characteristics of the porous body to be manufactured. The template is preferably subjected to conductive treatment such that the template will be easily plated in the second step.

(2) Second Step

Plating treatment is performed on the template to form a first plating layer including Ni on at least a portion of the surface of the template. The method of plating a first metal is not particularly limited as long as it is a process of providing metal plating by a known plating method. However, it is preferable to use an electroplating method. Electroplating treatment may be performed according to a conventional method. As a plating bath for Ni plating, a known or commercially available plating bath can be used, and examples thereof include a watt bath, a chloride bath, a sulfamic acid bath, and the like. Inter alia, a nickel sulfamate plating solution has a small plating stress and a good coverage, and thus flexibility can be secured even in an intermediate product before heat treatment, and trouble such as fracture during a manufacturing process can be suppressed.

By immersing the template in the plating bath, connecting the template to a negative electrode and connecting a counter electrode plate of Ni to a positive electrode, and passing a direct current or pulsed intermittent current, the surface of the template is coated with the first plating layer including Ni. The coating amount of the first plating layer is not particularly limited, and may be generally set to about 100 g/m$^2$ to 600 g/m$^2$, and may be preferably set to about 200 g/m$^2$ to 500 g/m$^2$.

(3) Third Step

The template is removed to form a hollow Ni porous body. The template is removed by being placed in an oxidizing atmosphere such as atmospheric air at more than or equal to 600° C. and less than or equal to 800° C., preferably more than or equal to 600° C. and less than or equal to 700° C., for example. Preferably, after heat treatment is performed in the oxidizing atmosphere, heat treatment is performed in a reducing atmosphere. While it is desirable to perform heat treatment in the reducing atmosphere at a temperature as high as possible, it is satisfactory as long as the temperature is more than or equal to 750° C. and less than or equal to 1000° C., in consideration of manufacturing cost and the material for a furnace body of a reducing furnace.

(4) Fourth Step

Plating treatment is performed on the Ni porous body to form a second plating layer including a second metal on at least a portion of the surface of the Ni porous body, thereby obtaining a porous body. As in the first plating step, the method of plating the second metal is not particularly limited as long as it is a process of providing metal plating by a known plating method. However, it is preferable to use the electroplating method. Electroplating treatment may be performed according to a conventional method.

The second plating layer preferably includes Sn. When the second plating layer is formed on the first plating layer, Ni in the first plating layer is diffused into the second plating layer, and a layer made of an alloy of Ni and the second metal is formed at an interface between the first plating layer and the second plating layer. Alternatively, the first plating layer and the second plating layer entirely become a Ni—Sn layer. The Ni—Sn layer has particularly high heat resistance and oxidation resistance. A Ni—Sn alloy layer may be plated on the Ni plating.

The coating amount of the second plating layer is not particularly limited, and may be generally set to about 10 g/m$^2$ to 300 g/m$^2$, and may be preferably set to about 20 g/m$^2$ to 250 g/m$^2$. Inter alia, the thickness (coating amount) of the second plating layer may be 0.5 μm to 20 μm (20 g/m$^2$ to 200 g/m$^2$), or may be 1 μm to 10 μm, because more than or equal to 80% by mass of the porous body is likely to become a layer made of an alloy of Ni and the second metal. It is preferable to perform heat treatment after formation of the second plating layer, in order to facilitate diffusion of Ni.

Formation of the second plating layer including Sn can be performed using a plating solution including sulfuric acid and stannous sulfate. Formation of the second plating layer including a Ni—Sn alloy can be performed by electrolytic plating treatment using a plating solution including stannous chloride, nickel chloride, and potassium pyrophosphate, for example.

(5) Fifth Step

The first current collector is obtained by causing a chromium adsorbent to be carried in pores of the porous body.

The chromium adsorbent is applied to the porous body in the state of a slurry or paste in which it is dispersed in a binder resin, for example. By immersing the porous body in the slurry or the like and then performing heat treatment, the chromium adsorbent can be carried in the pores of the porous body.

The binder resin is not particularly limited, and examples thereof include polymer binders such as cellulose derivatives (cellulose ethers) such as ethyl cellulose, vinyl acetate resins (including saponified vinyl acetate resins such as polyvinyl alcohol), and acrylic resins; and waxes such as paraffin wax.

The temperature for heat treatment is not particularly limited, either, and is desirably close to the operating temperature of the fuel cell. The temperature for heat treatment is more than or equal to 700° C. and less than or equal to 1000° C., for example.

The obtained first current collector has a shape that reflects the shape of the template used in the first step. For example, when the template has the shape of a sheet, the first current collector having the shape of a sheet is obtained. The first current collector having the shape of a sheet is cut into a desired shape, and then a plurality of the cut sheets are stacked and arranged between a first separator and the cathode, as necessary, for example.

Figure 4:
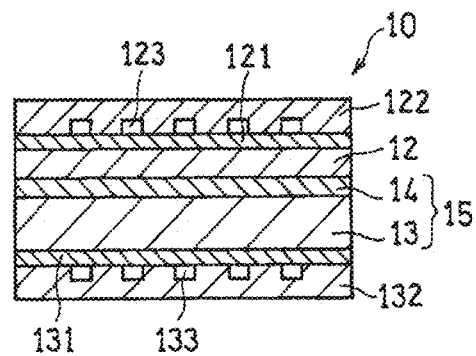
FIG. 4 is a cross sectional view schematically showing a configuration of a fuel cell in accordance with one embodiment of the present disclosure.

FIG. 4 schematically shows a cross sectional structure of a fuel cell 100.

A cell structure body 10 includes a cathode 12, an anode 13, and a solid electrolyte layer 14 interposed therebetween. Anode 13 and cathode 12 each have the shape of a flat plate, for example, and cell structure body 10 also has the shape of a flat plate. Anode 13 and solid electrolyte layer 14 are integrated to form an electrolyte layer-electrode assembly 15.

The thickness of anode 13 is larger than that of cathode 12, and anode 13 functions as a support for supporting solid electrolyte layer 14 (and therefore, cell structure body 10). However, the thickness of anode 13 does not necessarily have to be larger than that of cathode 12. For example, the thickness of anode 13 may be comparable with the thickness of cathode 12. Further, although the example where anode 13 and solid electrolyte layer 14 are integrated is shown, the present disclosure is not limited thereto.

Fuel cell 100 further includes a first current collector 121 as described above in contact with cathode 12. An oxidant is supplied to cathode 12 through first current collector 121. Since first current collector 121 has chromium adsorption performance, it is not necessary to arrange another chromium adsorption material within the fuel cell. Therefore, an increase in the size of the fuel cell is suppressed, and the number of components can be decreased. Further, since first current collector 121 is excellent in oxidation resistance, heat resistance, and thermal shock resistance, it can endure long-time use.

Fuel cell 100 may include oxidant dimples 123 for supplying the oxidant to cathode 12, fuel dimples 133 for supplying a fuel to anode 13, a first separator 122 in which oxidant dimples 123 are formed, a second separator 132 in which fuel dimples 133 are formed, and a second current collector 131 in contact with anode 13. Oxidant dimples 123 in first separator 122 are arranged to face cathode 12, and fuel dimples 133 in second separator 132 are arranged to face anode 13. The fuel is supplied to anode 13 through second current collector 131.

In the following, the individual constituent elements of the cell structure body other than the first current collector will be further described.

(Solid Electrolyte Layer)

The solid electrolyte layer has proton conductivity or oxygen ion conductivity in a medium temperature range of 400° C. to 600° C., for example. Since perovskite oxides such as $BaCe_{0.8}Y_{0.2}O_{2.9}$ (BCY) and $BaZr_{0.8}Y_{0.2}O_{2.9}$ (BZY) exhibit high proton conductivity in the medium temperature range, they can be used as a solid electrolyte of a medium temperature-type fuel cell. These solid electrolytes can be formed by sintering, for example.

The thickness of the solid electrolyte layer is 1 μm to 50 μm, for example, and is preferably 3 μm to 20 μm. When the thickness of the solid electrolyte layer is in such a range, the resistance of the solid electrolyte layer is suppressed low, which is preferable. The solid electrolyte layer is sandwiched between the cathode and the anode, and the solid electrolyte layer has one main surface in contact with the anode, and the other main surface in contact with the cathode.

(Cathode)

The cathode has a porous structure. When a proton-conductive solid electrolyte layer is used, a reaction between protons conducted through the solid electrolyte layer and oxide ions (oxygen reduction reaction) proceeds in the cathode. The oxide ions are produced by dissociation of the oxidant (oxygen) introduced from the oxidant dimples. Examples of the oxidant include a gas including oxygen, such as air.

As a material for the cathode, a known material can be used. As the cathode material, for example, a compound that includes lanthanum and has a perovskite structure (such as ferrite, manganite, and/or cobaltite) is preferable, and, of these compounds, a compound that further includes strontium is more preferable. Specifically, examples of the cathode material include lanthanum strontium cobalt ferrite (LSCF, $La_{1-x1}Sr_{x1}Fe_{1-y1}Co_{y1}O_{3-\delta 1}$, $0<x1<1$, $0<y1<1$, and $\delta 1$ represents an oxygen deficiency amount), lanthanum strontium manganite (LSM, $La_{1-x2}Sr_{x2}MnO_{3-\delta 1}$, $0<x2<1$, and $\delta 1$ represents an oxygen deficiency amount), lanthanum strontium cobaltite (LSC, $La_{1-x3}Sr_{x3}CoO_{3-\delta 1}$, $0<x3\leq 1$, and $\delta 1$ represents an oxygen deficiency amount), and the like. The cathode may include a catalyst such as Pt, from the viewpoint of facilitating the reaction between the protons and the oxide ions. When the cathode includes a catalyst, the cathode can be formed by mixing the catalyst and the material described above and sintering the mixture.

The thickness of the cathode is not particularly limited, and can be set as appropriate in the range from 5 μm to 2 mm, for example, and may be about 5 μm to 40 μm.

(Anode)

The anode has a porous structure. In the anode, a reaction to oxidize the fuel such as hydrogen introduced from the fuel dimples and release protons and electrons (fuel oxidation reaction) proceeds. Examples of the fuel include a gas including a gaseous body such as hydrogen, methane, ammonia, carbon monoxide, or the like.

As a material for the anode, a known material can be used. Examples of the anode material include a composite oxide composed of nickel oxide (NiO) as a catalyst component and a proton conductor (such as yttrium oxide ($Y_2O_3$), BCY, BZY, or the like).

The anode can be formed, for example, by sintering a source material. For example, the anode can be formed by sintering a mixture of NiO powder and powder of the proton conductor and the like. The thickness of the anode can be set as appropriate in the range from 10 μm to 2 mm, for example, and may be 10 μm to 100 μm.

(Separators)

Examples of a material for the first separator and the second separator can include heat resistant alloys such as stainless steel, a nickel-based alloy, a chromium-based alloy, and the like, in terms of heat resistance. Inter alia, stainless steel is preferable, because it is inexpensive. Since the operating temperature of a protomic ceramic fuel cell (PCFC) is about 400° C. to 600° C., stainless steel can be used as the material for the separators. When a plurality of cell structure bodies are stacked, each separator may include dimples (oxidant dimples and fuel dimples) on both sides, for example.

(Second Current Collector)

In addition to a current collection function, second current collector 131 has a function of supplying a fuel gas introduced from fuel dimples 133 to anode 13 in a diffused manner. Accordingly, it is preferable that each current collector is a structure body having a sufficient air permeability.

Examples of a structure body used for the second current collector include a porous body, a metal mesh, a punching metal, an expanded metal, and the like including silver, a silver alloy, nickel, a nickel alloy, or the like. Inter alia, a porous body is preferable in terms of lightweight property and air permeability. In particular, a three-dimensional network structure body as described above is preferable.

The fuel cell can be manufactured by a known method, except for using the cell structure body described above.

EXAMPLE

In the following, the present disclosure will be specifically described based on an example and a comparative example. However, the present invention is not limited to the following example.

Example 1

(1) Fabrication of First Current Collector

A 1.5 mm-thick polyurethane sheet was used as a template. Then, 100 g of carbon black, which was amorphous carbon with a particle diameter of 0.01 μm to 0.2 was dispersed in 0.5 L of a 10% aqueous solution of acrylic acid ester-based resin, to fabricate an adhesive paint with this ratio. Subsequently, the template made of polyurethane was immersed in the adhesive paint, was squeezed between rolls, and then was dried. Thereby, a conductive coating layer was formed on the surface of the template made of polyurethane.

Thereafter, 700 g/m$^2$ of nickel was deposited by an electroplating method on the template made of polyurethane subjected to conductive treatment, to form a first plating layer. As a plating solution, a nickel sulfamate plating solution was used.

The template plated with nickel was heated to 650° C. under an atmospheric oxidizing atmosphere, to remove the template. Subsequently, a reducing atmosphere was formed with a reducing gas using a gaseous mixture of nitrogen and hydrogen, and reduction treatment was performed at 1000° C., to obtain a hollow Ni porous body.

On the surface of the Ni porous body, a second plating layer (70 g/m$^2$) including Sn was formed by an electrolytic plating method. As a plating solution, a plating solution including stannous sulfate, sulfuric acid, cresol sulfonic acid, gelatin, and β-naphthol was used. Thereafter, heat treatment was performed under a hydrogen atmosphere at 1000° C. for two hours. Thereby, a hollow porous body having a skeleton with a three-dimensional network structure including a Ni—Sn layer was obtained. The ratio of Sn in the Ni—Sn layer was 10% by mass. The skeleton of the porous body was substantially entirely constituted by the Ni—Sn layer.

Thereafter, the porous body was immersed in a slurry including SrNiO$_3$, SrO, and MnO serving as chromium adsorbents and a binder resin, and then was dried. Thereafter, heat treatment was performed in an atmospheric atmosphere at 700° C. for two hours to cause the chromium adsorbents to be carried in the porous body (carried amount: 0.5 g/cm$^3$). Thereby, a first current collector (Ni—Sn current collector) was obtained. The mass ratio of the chromium adsorbents was set to SrNiO$_3$:SrO:MnO=8:1:1.

(2) Preparation of Fuel Cell

NiO (a catalyst source material) was mixed into YSZ powder which was a solid solution of ZrO$_2$ and Y$_2$O$_3$ such that 70% by mass of NiO was included therein, and the mixture was ground and kneaded with a ball mill. The ratio (atomic composition ratio) between Zr and Y in YSZ was set to 90:10. A slurry including the obtained mixture (55% by mass) and a binder resin was processed into a 1.0 mm-thick sheet by a doctor blade method, to obtain a precursor sheet for an anode. Similarly, a slurry including the above YSZ powder (55% by mass) and a binder resin was processed into a 12 μm-thick sheet by the doctor blade method, to obtain a precursor sheet for a solid electrolyte layer.

These precursor sheets were stacked and laminated, to obtain a stacked sheet having a total thickness of about 1.0 mm. Then, the obtained stacked body was heated in the atmospheric air at 600° C. for one hour, to remove the binder. Subsequently, co-sintering was carried out by performing heating treatment under an oxygen atmosphere at 1300° C. for two hours, to form an assembly of the anode and the solid electrolyte layer.

Subsequently, on the surface of the solid electrolyte layer, an LSCF paste was screen-printed, the LSCF paste being a mixture of powder of LSCF (La$_{0.6}$Sr$_{0.4}$Co$_{0.2}$Fe$_{0.8}$O$_{3-\delta}$) as a material for a cathode and an organic solvent, and firing was performed under an oxygen atmosphere at 1000° C. for two hours. The formed cathode had a thickness of 10 μm.

The first current collector was stacked on the surface of the cathode, and a second current collector made of a nickel porous body (Celmet manufactured by Sumitomo Electric Industries, Ltd., thickness: 1 mm, porosity: 95% by volume) was stacked on the surface of the anode. Further, a separator made of stainless steel having dimples was stacked on each current collector, to fabricate a fuel cell X having the configuration shown in FIG. 4.

(3) Evaluation of Oxidation Resistance and Thermal Shock Resistance of First Current Collector Heat treatment was performed on the first current collector. Heat treatment was performed in five cycles, each cycle including temperature raising and temperature lowering described below.

(Temperature Raising) Temperature was raised to 600° C. at 8° C./minute, and thereafter was kept for three hours.

(Temperature Lowering) The first current collector was furnace-cooled to 200° C., and thereafter temperature was kept for three hours.

Figure 5:
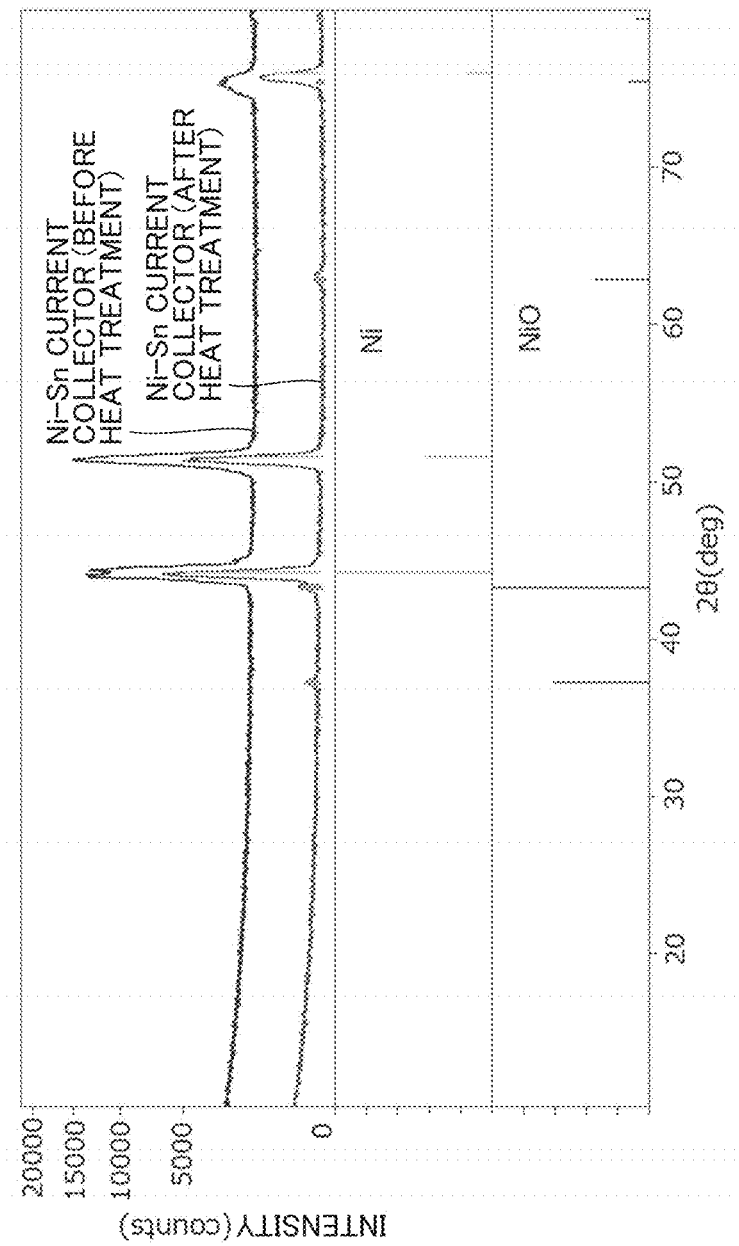
FIG. 5 is a graph showing results of measurement by XRD in an Example.
Figure 6:
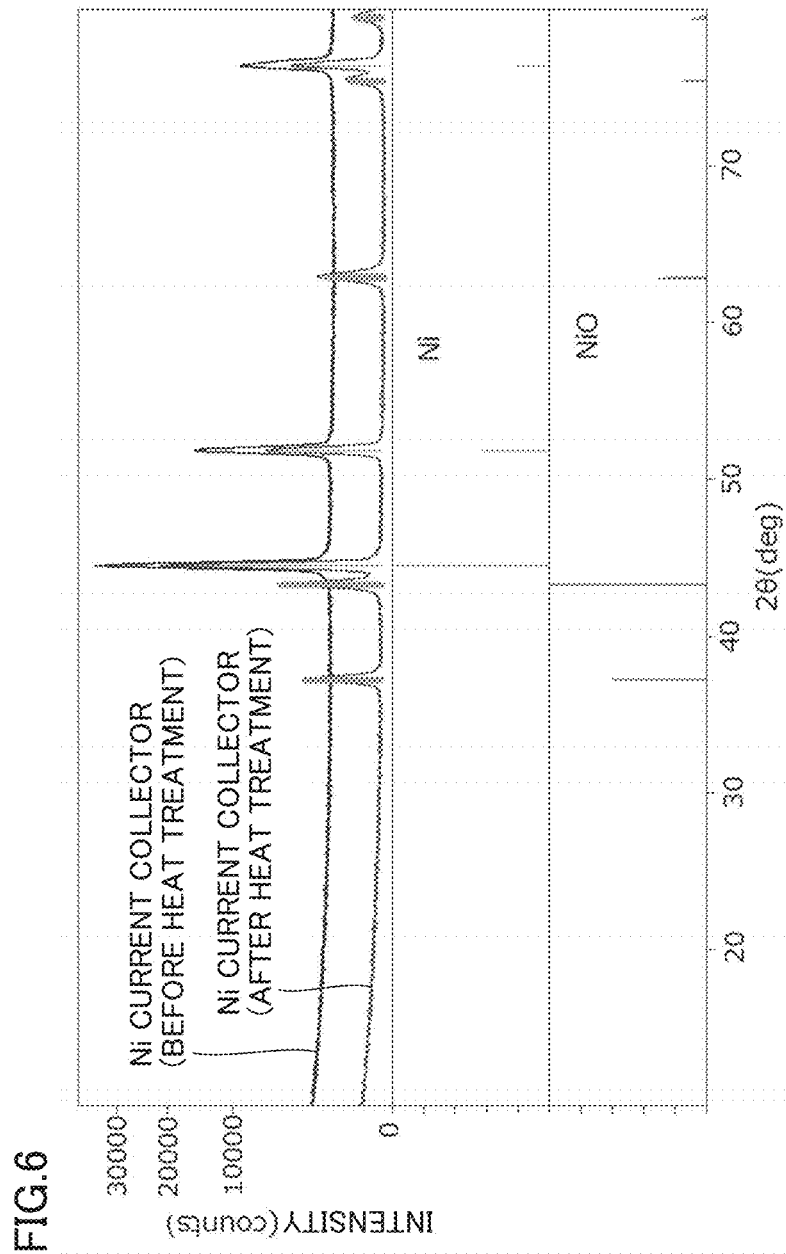
FIG. 6 is a graph showing results of measurement by XRD in a Comparative Example.
Figure 7:
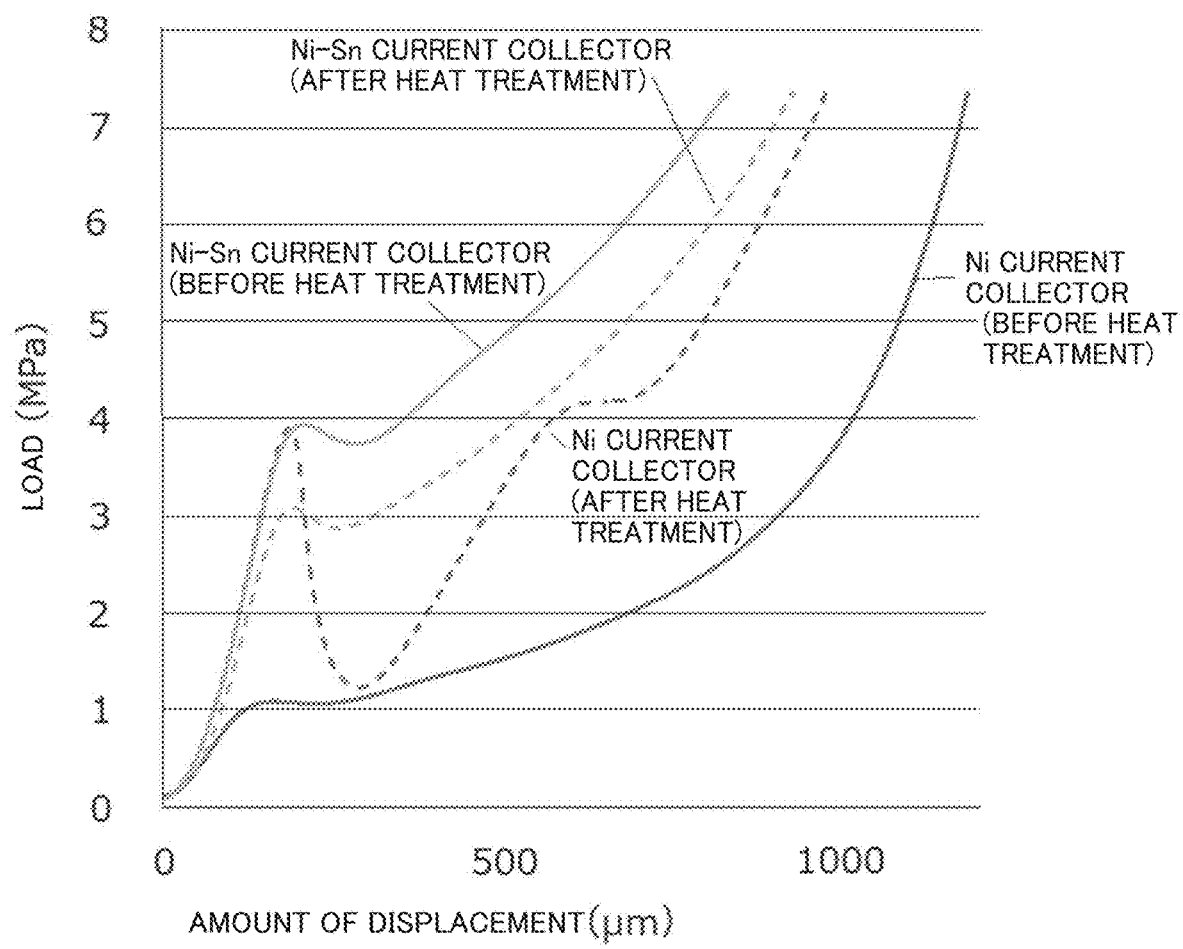
FIG. 7 is a graph showing results of a compression test in the Example and the Comparative Example.

The first current collector (Ni—Sn current collector) before and after heat treatment was evaluated with an X-ray diffraction (XRD) device. FIG. 5 shows results. Additionally, a compression test was conducted on the Ni—Sn current collector before and after heat treatment, according to JIS K 7018. FIG. 7 shows results. FIG. 5 and later described FIG. 6 also show peaks of Ni and NiO.

Comparative Example 1

A current collector (Ni current collector) and a fuel cell Y were fabricated in the same manner as in Example 1, except that a second plating layer was not formed in (1) Fabrication of First Current Collector. The obtained Ni current collector was evaluated in the same manner as in Example 1. FIGS. 6 and 7 show results.

It can be seen from FIGS. 5 and 6 that oxidation of the Ni—Sn current collector fabricated in Example 1 is suppressed even after heat treatment, when compared with the Ni current collector fabricated in Comparative Example 1. Further, deformation after heat treatment is also suppressed in the Ni—Sn current collector. On the other hand, a large deformation (buckling deformation) was observed in the Ni current collector after heat treatment. This is considered to be because the skeleton of the current collector became brittle due to oxidation of Ni into NiO, and was broken.

INDUSTRIAL APPLICABILITY

The current collector in accordance with the embodiment of the present disclosure is particularly suitable for use in SOFCs.

REFERENCE SIGNS LIST

100: fuel cell; 10: cell structure body; 12: cathode; 13: anode; 14: solid electrolyte layer; 15: electrolyte layer-electrode assembly; 121: first current collector; 122: first separator; 123: oxidant dimple; 131: second current collector; 132: second separator; 133: fuel dimple; 101: pore; 102: fibrous portion; 102a: void; 103: opening.

The invention claimed is:

1. A fuel cell comprising:
a cell structure body including a cathode, an anode, and a solid electrolyte layer interposed between the cathode and the anode; and
a current collector in contact with the cathode, wherein
an oxidant is supplied to the cathode through the current collector,
the current collector is a porous body made of a metal material, with a chromium adsorbent carried inside pores of the porous body throughout the entirety of the current collector,
the metal material includes a first metal and a second metal,
the first metal includes nickel, and
the second metal includes at least one selected from the group consisting of tin, aluminum, cobalt, titanium, manganese, tungsten, copper, silver, and gold.

2. The fuel cell according to claim 1, wherein the metal material includes an alloy of the first metal and the second metal.

3. The fuel cell according to claim 1, wherein a ratio of the second metal to a total amount of the first metal and the second metal included in the metal material is more than or equal to 4% by mass and less than or equal to 15% by mass.

4. The fuel cell according to claim 1, wherein the second metal is tin.

5. The fuel cell according to claim 1, wherein the porous body has a skeleton with a three-dimensional network structure.

6. The fuel cell according to claim 1, wherein the porous body has pores with a pore diameter of 100 μm to 4000 μm.

* * * * *